United States Patent [19]

Vanderlaan

[11] Patent Number: 4,507,634

[45] Date of Patent: Mar. 26, 1985

[54] FORCE MOTOR WITH NULL CENTERING AND NULL POSITION BIAS

[75] Inventor: Robert D. Vanderlaan, Kalamazoo, Mich.

[73] Assignee: Pneumo Corporation, Boston, Mass.

[21] Appl. No.: 489,237

[22] Filed: Apr. 28, 1983

[51] Int. Cl.³ ............................................. H01F 7/08
[52] U.S. Cl. .................................. 335/272; 335/229; 310/36; 310/86
[58] Field of Search ............... 335/272, 229, 230, 248, 335/273, 274, 222; 310/27, 36–39, 86

[56] References Cited

U.S. PATENT DOCUMENTS

| | | | |
|---|---|---|---|
| 3,164,733 | 1/1965 | Molitor | 335/272 X |
| 3,229,170 | 1/1966 | Daugherty et al. | 335/272 |
| 3,435,393 | 3/1969 | Meisel | 310/36 X |
| 3,474,313 | 10/1969 | Lucien | 310/36 X |
| 3,486,148 | 12/1969 | Christensen | 310/36 X |
| 3,587,016 | 6/1971 | Coakley | 310/36 X |
| 3,644,763 | 2/1972 | Skrobisch | 310/36 |
| 3,911,300 | 10/1975 | Lebkuchner | 310/86 |
| 4,164,722 | 8/1979 | Garvey | 310/36 X |
| 4,282,502 | 8/1981 | Nicholson | 335/229 X |
| 4,329,672 | 5/1982 | Stahl et al. | 310/36 X |
| 4,345,228 | 8/1982 | Idogaki et al. | 335/274 X |
| 4,403,204 | 9/1983 | Crawshaw et al. | 335/229 |

Primary Examiner—Donovan F. Duggan
Attorney, Agent, or Firm—Maky, Renner, Otto & Boisselle

[57] ABSTRACT

Motor includes an internal torsion spring which provides for null centering of the rotor assembly while minimizing bearing load reactions and related friction. Two such centering springs may be provided whereby in the event one spring should fail, the other spring will still be operative to perform the desired null centering function. Also, an internal leaf spring interiorly of the rotor casing absorbs the full stroke rotor inertia without part damage or deformation. The null position bias of a motor driven valve may be established by adjustment of a pair of set screws which adjust the rotor assembly off null without inducing undesirable friction. The stator electrical torque null of the motor may also be set by providing an adjustable eccentric pin in the stator housing which is engageable in a notch in the rotor casing.

20 Claims, 8 Drawing Figures

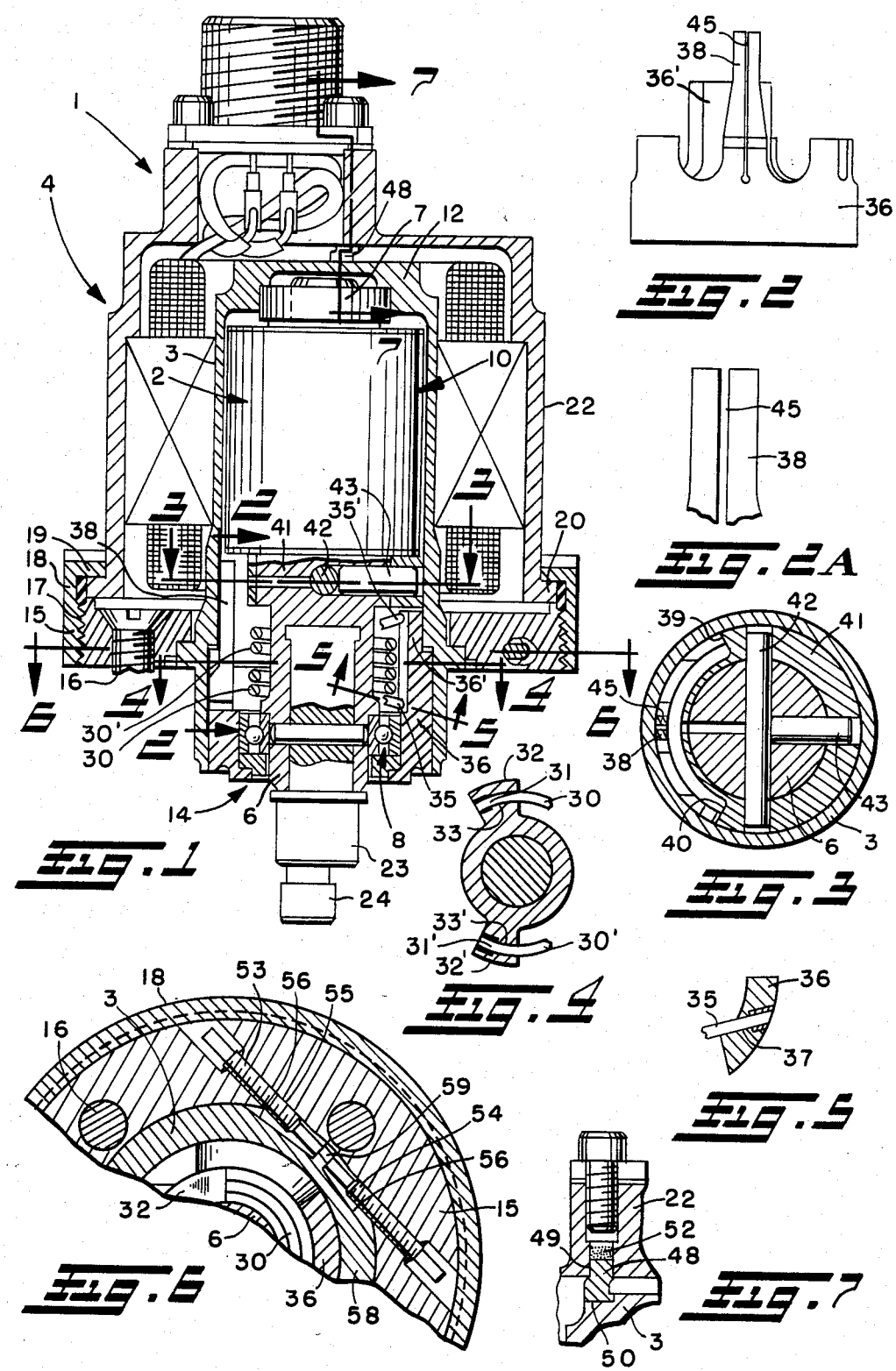

FORCE MOTOR WITH NULL CENTERING AND NULL POSITION BIAS

This invention relates generally as indicated to a force motor with null centering end null position bias.

BACKGROUND OF THE INVENTION

The force motor of the present invention is a limited angle torque motor which is particularly suited for use in certain types of high pressure fluid proportional servo control systems including but not limited to aircraft controls to drive a proportional control valve of relatively short stroke. The fluid pressure may for example be on the order of 1000 psi or more. In such a motor, it would be advantageous to provide for null centering of the rotor assembly as well as be able to establish valve null position bias through adjustments within the motor itself. Another desirable feature would be to provide for absorption of the full stroke rotor inertia within the motor. Moreover, provision should desirably be made for tamper-proof positioning of the stator assembly on the rotor assembly so that once the stator electrical torque null is set, it cannot be inadvertently altered.

SUMMARY OF THE INVENTION

With the foregoing in mind, it is a principal object of this invention to provide for internal null centering of the rotor assembly of a limited angle torque motor while minimizing bearing load reactions and related friction.

Another object is to provide for null position bias of the external load by adjustment of the rotor assembly off null.

Still another object is to permit significant null position bias of the external load to be established without inducing friction that would otherwise result if a spring bias were applied directly to the external load itself.

A further object is to provide for internal absorption of the full stroke rotor inertia without part damage or deformation.

Yet another object is to provide for the setting of the stator electrical torque null.

Another object is to provide for tamper-proof positioning of the stator assembly on the rotor assembly so that once the stator electrical torque null is set, it cannot be inadvertently altered.

These and other objects of the present invention may be achieved by utilizing an internal torsion spring to obtain the desired null centering of the rotor assembly. Dual redundant centering springs are desirably provided whereby in the event one spring should fall, the other spring will still be operative to perform the desired null centering function. A rotor imbalance mass may be used to balance the mass of an external load reflected back into the motor. Also, an internal leaf spring may be provided within the rotor casing to absorb the full stroke rotor inertia without part damage or deformation. To establish null position bias of the external load, a pair of set screws are provided which permit adjustment of the rotor assembly off null without inducing undesirable friction. Also, the stator electrical torque null may be set by providing an adjustable eccentric pin in a bore in the stator housing which is engageable in a notch in the adjacent end of the rotor casing. The bore desirably extends completely through the stator housing, whereby after the motor torque symmetry has been established, the pin may be locked in place by putting structural adhesive in the bore, thus providing tamper-proof positioning of the stator and housing assembly on the rotor assembly.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a preferred form of force motor in accordance with the present invention;

FIG. 2 is a side elevation view of the spring stop for the rotor assembly of FIG. 1;

FIG. 2A is an enlarged fragmentary side elevation view of the leaf spring portion of the spring stop of FIG. 2 showing the slot therein;

FIG. 3 is a fragmentary transverse section through the rotor assembly of FIG. 1 taken along the plane of the line 3—3 thereof to show the manner in which a sleeve member is attached to the rotor shaft for rotation therewith;

FIG. 4 is a transverse section through the rotor shaft of FIG. 1 taken along the plane of the line 4—4 thereof to show the manner in which one end of a pair of dual redundant torsion springs is connected thereto;

FIG. 5 is an enlarged fragmentary section through the spring stop of FIG. 1 to show the manner in which the other end of one of the torsion springs is connected thereto;

FIG. 6 is a fragmentary transverse section through the motor of FIG. 1, taken along the plane of the line 6—6 thereof to show the manner in which the rotor assembly may be adjusted off null; and FIG. 7 is an enlarged fragmentary vertical section through the stator housing and rotor casing of FIG. 1, taken along the plane of the line 7—7 thereof, to show the tamper-proof pin connection between the stator and rotor assemblies.

DETAILED DESCRIPTION OF THE PREFERRED EMBODIMENT

Referring now in detail to the drawing, and initially to FIG. 1, a preferred form of force motor in accordance with the invention is generally indicated by the reference numeral 1. Such force motor is primarily designed for use in high pressure fluid systems for directly driving a valve in proportional servo control systems including but not limited to aircraft controls, and may generally be of the type disclosed in applicant's copending application Ser. No. 482,769, entitled "Limited Angle Torque Motor", filed Apr. 7, 1983, which is incorporated herein by reference. However, it should be understood that such force motor could be used to drive other external loads as well. Preferably, such motor is a non-commutated two pole stationary coil rotary magnet design including a rotor assembly 2 contained within a rotor casing 3 and a stator and housing assembly 4 surrounding the rotor casing.

The rotor assembly includes a rotor shaft 6 journal mounted within the rotor casing 3 adjacent opposite ends thereof by rotor shaft bearings 7, 8 suitably supported by common casing structure. Attached to the rotor shaft are one or more permanent magnets, preferably rare earth magnets. Because such rare earth magnets are extremely brittle, they are desirably contained within a protective cover 10 to prevent potential rotor magnet breakage contamination.

One end 12 of the rotor casing may be closed, whereas the other end 14 is open to permit connection of the rotor shaft 6 to a valve member or other external load through a suitable linkage mechanism, not shown. A hold down member 15 may be used to clamp the rotor casing to a housing or other support structure as by means of mounting bolts 16.

An annular external threaded surface 17 may be provided on the hold down member to permit the stator and housing assembly 4 to be removably attached thereto as by means of a threaded sleeve 18 or the like. The inner end of the sleeve may have an inturned flange 19 which overlies an out-turned flange 20 on the outer end of the stator housing 22. When thus assembled, the open end 14 of the rotor casing 3 may extend into an opening in the valve housing to expose the interior of the rotor casing including the rotor assembly contained therein to system pressure while isolating the stator and housing assembly from such system pressure. A drive shaft 23 having on the outer end thereof an eccentric 24 or other suitable form of rotary to linear gearing that preferably drives through a cosine characteristic may be suitably connected to the rotor shaft 6 to translate the rotary movement of the rotor shaft to linear movement of a valve member or other external load through a suitable drive linkage, not shown.

A two-pole motor should be utilized whenever it is desired to obtain a relatively large work output and/or a substantially uniform work output. Such a motor produces a relatively high torque output over a relatively large excursion of the rotor shaft. Also, it has been found that the stator windings of a two-pole motor can be graded to optimize the torque versus rotation profile in order to achieve a substantially cosine relationship between the applied motor current and the rotational angle to complement the cosine function that an eccentric or other such rotary to linear gearing tends to follow to produce a substantially constant force output over a relatively large excursion of the rotor shaft.

Contained within the stator housing 22 are the stator laminations and stator windings. In the preferred embodiment shown herein, two or more alternate coil windings are desirably provided for obtaining two or more channel electronic redundancy. If one coil or its associated electronics should fail, its counterpart channel(s) will maintain control by equalizing the failed channel force effect. The ability to sense which channel has failed will be provided for in the failure monitoring electronics such that when detected, the failed channel is decoupled and made passive.

To obtain null centering of the rotor assembly 2 within the rotor casing 3 while minimizing bearing load reactions and related friction, one or more internal torsion centering springs are provided. Preferably, dual redundant centering springs 30, 30' are provided, each contained within the rotor casing 3 and surrounding the rotor shaft 6 in axially spaced relation as shown in FIG. 1. The adjacent ends 31, 31' of the centering springs 30, 30' may be attached to protruding ears 32, 32' on opposite sides of the rotor shaft 6 as shown in FIG. 4. Such ears may have holes 33, 33' therein for receipt of the spring ends 31, 31' which may be secured in place as by soldering.

The opposite ends 35, 35' of the centering springs 30, 30' may be grounded to a spring stop member 36 which may be received within the open end 14 of the rotor casing and secured in place as by welding. One such connection between the end 35 of spring 30 and the spring stop member 36 is shown in FIG. 5, such end 35 extending into a hole 37 in the spring stop member 36 and secured in place as by soldering. The end 35' of spring 30' may be similarly connected to an axially extending portion 36' of the spring stop member at another point axially spaced from the end 35 connection.

As will be apparent, as long as the force motor is not energized, the torsion springs 30, 30' acting on the rotor shaft 6 will bias the rotor assembly 2 in its null position. Moreover, after the force motor has been actuated to drive the rotor assembly through its limited arcuate movement in either direction from its null position, upon de-energization of the force motor, the torsion springs will once again return the rotor assembly to such null position.

The advantage in providing two such centering springs 30, 30' is that if one of such springs should fail, the other spring will still be operative to perform the desired null centering function.

The spring stop member 36 prevents disassembly of the rotor assembly from the casing and also acts as a bearing retainer for the bearing 8. In addition, an internal leaf spring 38 is preferably provided on the spring stop member 36. As clearly shown in FIGS. 1-3, the internal leaf spring 38 extends longitudinally from the spring stop member 36 along the inner surface of the rotor casing radially outwardly of the centering springs 30, 30' and in radial overlapping relation with a pair of circumferentially spaced apart stop shoulders 39, 40 on a sleeve member 41 which may be pinned to the rotor shaft 6 by a pair of retainer pins 42, 43 for movement therewith. One of the retainer pins 42 may be a cross pin extending substantially completely through the rotor shaft and sleeve member, whereas the other pin 43 desirably extends through one side of the sleeve member toward the center of the rotor shaft in line with and perpendicular to the pin 42.

When the rotor assembly is in its null or neutral position, the leaf spring 38 should be positioned intermediate the stop shoulders 39, 40 and located approximately $\pm 1°$ of the mid position of rotation of the rotor shaft permitted by the leaf spring as shown in FIG. 3. During energization of the motor to cause limited arcuate movement of the rotor shaft in either direction away from its null position, as the rotor shaft approaches the end of its stroke, one or the other of the stop shoulders will engage the internal leaf spring to dampen the end movement of the rotor shaft and thus the external load driven thereby (such as a valve plunger, not shown), thus absorbing the full stroke rotor inertia without part damage or deformation.

The rotor imbalance mass caused by the sleeve member 41 may also be advantageously used to balance the mass of the external load reflected back into the motor.

A longitudinal slot 45 is desirably provided in the internal leaf spring to increase its spring damping effect. When either of the stop shoulders 39, 40 engages the leaf spring, first the slot 45 will close and then the entire leaf spring will deflect a small distance to absorb the full stroke rotor inertia without part damage or deformation as aforesaid.

The neutral position of the centering springs 30, 30' may be set during assembling of the rotor assembly 2, following which the rotor assembly may be inserted into the rotor casing 3 and the spring stop 36 is welded in place. Then the stator and housing assembly 4 may be placed over the outer end of the rotor casing and attached thereto by means of the sleeve retainer 18.

Prior to completing such assembly, the stator electrical torque null may be set by utilizing an adjustable eccentric anti-rotation pin 48. As best seen in FIG. 7, one end of the pin 48 is received in a bore 49 in the inner end of the stator housing 22, whereas the other end is adapted to be received in a notch 50 in the adjacent end of the rotor casing. The bore 49 extends completely through the stator housing 22, whereby after the motor torque symmetry has been established by rotating the stator housing relative to the rotor and the pin has been rotated in the notch to retain such orientation, the pin may be locked in place by putting structural adhesive 52 into the bore in contact with the pin, thus providing tamper-proof positioning of the stator and housing assembly on the rotor assembly.

The motor 1 may be clamped to a housing by the mounting bolts 16 in the hold down member 15 and the rotor shaft may be drivingly connected to a valve member or other mechanism through the eccentric 24 on the drive shaft 23 as aforesaid. Following such assembly, the null bias of the valve or other external load may be established by fine adjustment of a pair of opposed set screws 53, 54 located in a threaded cross bore 55 in the hold down member 15. The ends of the set screws may extend into a pair of milled slots 56 in an external shoulder 58 on the rotor casing for engagement with the opposite sides of a stop shoulder 59 which may be a portion of the external shoulder 58 left intact during milling of the slots 56. Turning of the set screws in opposite directions will cause limited angular adjustment of the rotor assembly off null to establish the desired valve null position bias. In this way, significant valve null position bias may be set without inducing friction that would otherwise result if a spring force were applied directly to the valve or other external load itself.

Before the set screws can be adjusted, the sleeve retainer 18 must be backed off sufficiently to expose the set screws. After the desired valve null position bias has been established, the sleeve retainer may be retightened, which results in the sleeve retainer covering the set screws so that they cannot be readily tampered with.

Although the invention has been shown and described with respect to a certain preferred embodiment, it is obvious that equivalent alterations and modifications will occur to others skilled in the art upon the reading and understanding of the specification. The present invention includes all such equivalent alternations and modifications, and is limited only by the scope of the claims.

The embodiments of the invention in which an exclusive property or privilege is claimed are defined as follows:

1. A force motor comprising a rotor casing containing a rotor assembly, a stator assembly surrounding said rotor casing, said rotor assembly including a rotor shaft, and absorbing means contained within said rotor casing for absorbing the inertia of said rotor assembly as said rotor assembly nears the end of its stroke, said absorbing means comprising a leaf spring in said rotor casing engageable by a stop shoulder on said rotor assembly as said rotor assembly nears the end of its stroke.

2. The motor of claim 1 wherein there are a pair of circumferentially spaced apart stop shoulders on said rotor assembly engageable with said leaf spring during rotation of said rotor assembly in opposite directions as said rotor assembly nears the opposite ends of its stroke.

3. The motor of claim 2 wherein said leaf spring has a longitudinal slot therein to increase its spring damping effect.

4. The motor of claim 1 further comprising means for providing an imbalance mass on said rotor assembly which balances the mass of an external load reflected back into said motor.

5. The motor of claim 4 wherein said means for providing an imbalance mass comprises a sleeve member attached to said rotor assembly, said sleeve member having a pair of circumferentially spaced apart shoulders thereon engageable with said leaf spring during rotation of said rotor assembly in opposite directions as said rotor assembly nears the end of its stroke.

6. The motor of claim 1 further comprising means contained within said rotor casing for achieving null centering of said rotor assembly within said rotor casing whenever said force motor is not energized.

7. The motor of claim 6 wherein said last-mentioned means comprises torsion spring means contained within said rotor casing surrounding said rotor shaft.

8. The motor of claim 7 further comprising a stop member connected to said rotor casing, said torsion spring means having opposite ends connected to said rotor shaft and stop member, respectively.

9. The force motor of claim 8 wherein there are two of said torsion spring means each having one end connected to said rotor shaft and the other end connected to said rotor casing for obtaining null centering of said rotor assembly within said rotor casing, whereby should one of said torsion spring means fail, the other torsion spring means will still perform the desired null centering function, said rotor shaft having a pair of protruding ears on opposite sides thereof to which one end of said torsion spring means are connected, said torsion spring means extending in opposite directions in axially spaced relation surrounding said rotor shaft.

10. The motor of claim 1 further comprising a stop member connected to said rotor casing, said leaf spring being connected to said stop member.

11. The motor of claim 10 further comprising a sleeve member connected to said rotor shaft for movement therewith, and torsion spring means contained within said rotor casing surrounding said rotor shaft for obtaining null centering of said rotor assembly within said rotor casing, said torsion spring means having opposite ends connected to said rotor shaft and stop member, respectively, said sleeve member including a pair of circumferentially spaced apart stop shoulders respectively engageable by said leaf spring during rotation of said rotor assembly in opposite directions as said rotor assembly nears the opposite ends of its stroke, said leaf spring being positioned intermediate said stop shoulders when said rotor assembly is in its null position.

12. The motor of claim 10 wherein said rotor casing is closed at one end and open at the other end, said stop member being secured in place in said open end to retain said rotor assembly within said rotor casing.

13. The motor of claim 12 wherein said rotor assembly includes a rotor shaft journaled in a pair of axially rotor shaft bearings supported by a common structure of said rotor casing, said stop member acting as a bearing retainer for one of said bearings.

14. The motor of claim 1 further comprising mounting means for mounting said motor to a support structure, means for connecting said rotor shaft to an external load for actuation thereby, and means for adjusting the angular orientation of said rotor casing relative to said mounting means to establish a null position bias for such external load.

15. The motor of claim 14 wherein said means for adjusting the angular orientation of said rotor casing comprises screw means threadedly engaging said mounting means and engageable with the exterior of said rotor casing for causing limited angular adjustment of said rotor assembly off null.

16. The motor of claim 15 wherein there are a pair of opposed screw means threadedly engaging said mounting means and engageable with opposite sides of a shoulder on the exterior of said rotor casing, whereby rotation of said screw means in opposite directions will cause limited angular adjustment of said rotor casing off null.

17. The motor of claim 1 further comprising means for locating said stator assembly on said rotor assembly at the electrical torque null of said stator assembly, said means for locating comprising an eccentric pin on said stator assembly which extends into a notch in said rotor casing.

18. The motor of claim 17 wherein said stator assembly includes a stator housing, and said pin is received in a through bore in said stator housing, said pin being adapted to be locked in place within said bore by adhesive placed in said bore.

19. A force motor comprising a rotor casing, a rotor assembly contained within said rotor casing, a stator assembly surrounding said rotor casing, said rotor assembly including a rotor shaft, spring means for achieving null centering of said rotor assembly within said rotor casing when said motor is de-energized, mounting means for mounting said motor to a support structure, means for connecting said rotor shaft to an external load for actuation thereby, and adjusting means for adjusting the angular orientation of said rotor casing relative to said mounting means to establish a null position bias for such external load, said adjusting means comprising a pair of opposed set screws axially movable in said mounting means and engageable with opposite sides of an external shoulder on said rotor casing, whereby axial movement of said set screws in opposite directions will cause limited angular adjustment of said rotor assembly off null.

20. A force motor comprising a rotor casing, a rotor assembly within said rotor casing, a stator assembly surrounding said rotor casing, a stator housing surrounding said stator assembly, and locating means for locating said stator assembly on said rotor assembly at the electrical torque null of said stator assembly, said locating means comprising an eccentric pin on said stator housing which extends into a notch in said rotor casing, said stator housing having a through bore in which said pin is received.

* * * * *